United States Patent
Tsukagoshi et al.

(10) Patent No.: US 9,947,931 B2
(45) Date of Patent: *Apr. 17, 2018

(54) NON-AQUEOUS ELECTROLYTE SECONDARY BATTERY INCLUDING PHOSPHORIC ACID ESTER COMPOUND CONTAINING AT LEAST ONE METAL ELEMENT

(71) Applicant: Panasonic Intellectual Property Management Co., Ltd., Osaka (JP)

(72) Inventors: Takafumi Tsukagoshi, Hyogo (JP); Tomoki Shiozaki, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 348 days.

This patent is subject to a terminal disclaimer.

(21) Appl. No.: 14/788,790

(22) Filed: Jul. 1, 2015

(65) Prior Publication Data

US 2016/0036057 A1    Feb. 4, 2016

(30) Foreign Application Priority Data

Jul. 30, 2014  (JP) ................. 2014-155229

(51) Int. Cl.
*H01M 4/62*    (2006.01)
*H01M 10/0525*    (2010.01)
(Continued)

(52) U.S. Cl.
CPC ....... *H01M 4/628* (2013.01); *H01M 10/4235* (2013.01); *H01M 10/052* (2013.01)

(58) Field of Classification Search
CPC .... H01M 6/16; H01M 10/05; H01M 10/0568; H01M 10/4235; H01M 4/628; H01M 2/1653

See application file for complete search history.

(56) References Cited

U.S. PATENT DOCUMENTS 6,162,563 A * 12/2000 Miura ............... C08G 65/22
                                                        429/309
2003/0124432 A1* 7/2003 Miura ............... C08G 65/02
                                                        429/317
(Continued)

FOREIGN PATENT DOCUMENTS

JP      4-184870         7/1992
WO    WO-2005/080490 A1 *  9/2005 ............ C08L 5/08

*Primary Examiner* — Kenneth J Douyette
(74) *Attorney, Agent, or Firm* — McDermott Will & Emery LLP

(57) ABSTRACT

Provided is a nonaqueous electrolyte secondary battery including a nonaqueous electrolyte and an electrode assembly including a positive electrode, a negative electrode, and a separator disposed between the positive electrode and the negative electrode. The electrode assembly further includes a layer containing a metal oxide powder between the positive electrode and the negative electrode. The positive electrode contains a phosphate ester compound represented by Formula (1);

$$\begin{array}{c} -\!\!\left[\!\!\begin{array}{c} \mathrm{C} \\ | \\ \mathrm{O} \\ | \\ \mathrm{O}\!=\!\mathrm{P}\!-\!\mathrm{O} \\ | \ \ \ \ \backslash \\ \mathrm{O} \ \ \ \ \mathrm{Y} \\ \backslash \\ \mathrm{X} \end{array}\!\!\right]_{n} \end{array} \quad (1)$$

where X and Y each independently represent a metal atom, a hydrogen atom, or an organic group; at least one of X and Y represents a metal atom; X and Y are coincident when the metal atom is divalent; and n represents an integer of 2 or more and 10 or less.

5 Claims, 1 Drawing Sheet

(51) Int. Cl.
*H01M 6/16* (2006.01)
*H01M 10/052* (2010.01)
*H01M 10/42* (2006.01)

(56) References Cited

U.S. PATENT DOCUMENTS

| | | | | |
|---|---|---|---|---|
| 2003/0235759 A1* | 12/2003 | Honbo | ............... | H01M 4/56 429/225 |
| 2004/0241546 A1* | 12/2004 | Hatta | ............... | H01M 4/136 429/231.1 |
| 2006/0210884 A1* | 9/2006 | Kawaguchi | ......... | H01M 2/1653 429/329 |
| 2007/0099089 A1* | 5/2007 | Miura | ............... | C08G 65/14 429/307 |
| 2010/0216022 A1* | 8/2010 | Sano | ............... | H01M 4/134 429/212 |

* cited by examiner

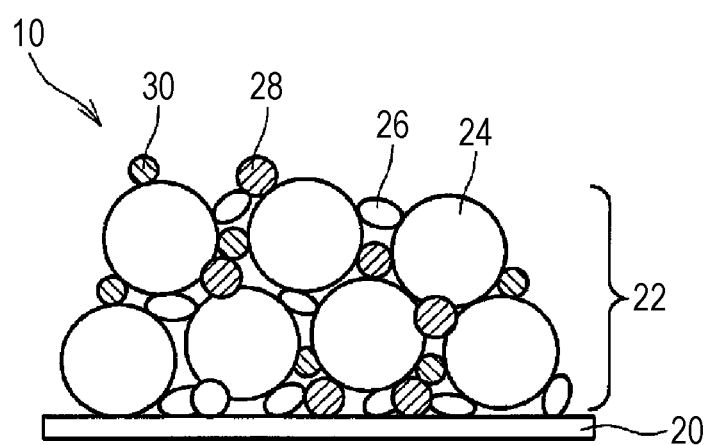

NON-AQUEOUS ELECTROLYTE SECONDARY BATTERY INCLUDING PHOSPHORIC ACID ESTER COMPOUND CONTAINING AT LEAST ONE METAL ELEMENT

BACKGROUND

1. Technical Field

The present disclosure relates to a nonaqueous electrolyte secondary battery, more specifically, to a lithium on secondary battery.

2. Description of the Related Art

In nonaqueous electrolyte secondary batteries, phosphorus-containing compounds are known as flame retardants inhibiting exothermic reaction between positive electrode active materials and electrolytic solutions being liquid nonaqueous electrolytes. Japanese Patent No. 3131905 discloses inhibition of the exothermic reaction between a positive electrode active material and an electrolytic solution by dissolving a phosphate ester in the electrolytic solution in an amount of 15% by mass or more based on the total amount of the electrolytic solution.

SUMMARY

One non-limiting and exemplary embodiment provides a nonaqueous electrolyte secondary battery being excellent in battery characteristics, in particular, in flame retardancy and charge/discharge efficiency.

In one general aspect, the techniques disclosed here feature a nonaqueous electrolyte secondary battery comprising a nonaqueous electrolyte and an electrode assembly including a positive electrode, a negative electrode, and a separator disposed between the positive electrode and the negative electrode. The electrode assembly further includes a layer containing a metal oxide powder between the positive electrode and the negative electrode. The positive electrode contains a phosphate ester compound represented by the following Formula (1):

[Chem. 1]

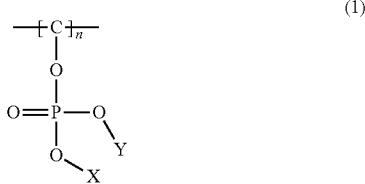

(1)

where X and Y each independently represent a metal atom, a hydrogen atom, or an organic group; at least one of X and Y represents a metal atom; X and Y are coincident when the metal atom is divalent; and n represents an integer of 2 or more and 10 or less.

The nonaqueous electrolyte secondary battery according to an aspect of the present disclosure inhibits exothermic reaction and is excellent in battery characteristics, in particular, in flame retardancy and charge/discharge efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGURE is a cross-sectional view of the positive electrode of a nonaqueous electrolyte secondary battery according to an embodiment of the present disclosure.

DETAILED DESCRIPTION

In a nonaqueous electrolyte secondary battery comprising a nonaqueous electrolyte and an electrode assembly including a positive electrode, a negative electrode, and a separator disposed between the positive electrode and the negative electrode, inhibition of exothermic reaction between the positive electrode active material contained in the positive electrode and the electrolytic solution being a liquid non-aqueous electrolyte is very important from the point of view of safely using the nonaqueous electrolyte secondary battery. Japanese Patent No. 3131905 describes use of a phosphate ester in an amount of 15% by mass or more based on the total amount of the electrolytic solution for enhancing the flame retardancy. However, the technology disclosed in Japanese Patent No. 3131905 may decrease the ionic conductance of the electrolytic solution due to a large amount of the phosphate ester dissolved in the electrolytic solution or may decrease the charge/discharge efficiency due to a reduction of the phosphate ester occurred on the surface of the negative electrode.

The present inventors have diligently studied based on the findings described above and have arrived at each aspect described below.

A nonaqueous electrolyte secondary battery according to a first aspect of the present disclosure comprises, for example, a nonaqueous electrolyte and an electrode assembly including a positive electrode, a negative electrode, and a separator disposed between the positive electrode and the negative electrode. The electrode assembly further comprises a layer containing a metal oxide powder between the positive electrode and the negative electrode. The positive electrode contains a phosphate ester compound represented by Formula (1):

[Chem. 2]

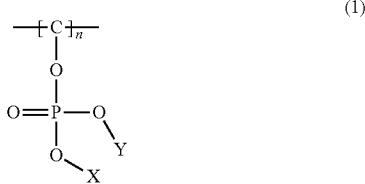

(1)

where X and Y each independently represent a metal atom, a hydrogen atom, or an organic group; at least one of X and Y represents a metal atom; X and Y are coincident when the metal atom is divalent; and n represents an integer of 2 or more and 10 or less.

In the first aspect, the positive electrode contains a phosphate ester compound represented by Formula (1), which inhibits exothermic reaction between the positive electrode active material and the electrolytic solution and prevents a reduction in charge/discharge efficiency caused by dissolution of the phosphate ester into the electrolytic solution. At the same time, since the phosphate ester compound represented by Formula (1) has high hydrophilicity and high hygroscopicity, water adsorbed to the phosphate ester compound during the production process diffuses in the nonaqueous electrolytic solution after the production of the battery to cause side reaction with the negative electrode active material, which may reduce the charge/discharge efficiency. However, in the first aspect, a layer containing a metal oxide powder disposed between the positive electrode and the negative electrode traps the water adsorbed to the phosphate ester compound before the water reaches the negative electrode and thereby can inhibit the side reaction at the negative electrode. As a result, the nonaqueous electrolyte secondary battery can achieve excellent flame retardancy while maintaining the charge/discharge efficiency.

In a second aspect, for example, at least one of X and Y in Formula (1) according to the first aspect may be Mg or Ca. In the second aspect, the solubility of the phosphate ester compound in the electrolytic solution is further reduced to enhance the thermal stability of the nonaqueous electrolyte secondary battery.

In a third aspect, for example, the phosphate ester compound according to the first aspect or the second aspect may be a metal salt of myo-inositol-1,2,3,4,5,6-hexaphosphate represented by Formula (3):

[Chem. 3]

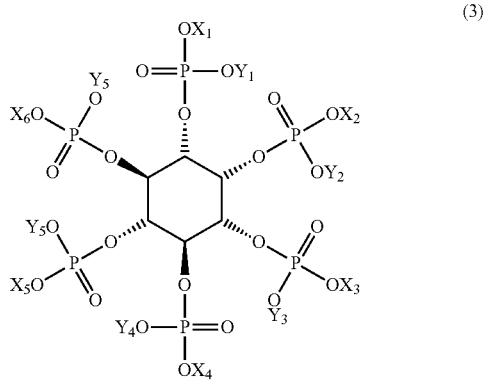

(3)

where $X_1$ to $X_6$ and $Y_1$ to $Y_6$ each independently represent a metal atom, a hydrogen atom, or an organic group; at least one of $X_1$ to $X_6$ and $Y_1$ to $Y_6$ represents a metal atom; $X_m$ and $Y_m$, in which the subscript m of X is the same as that of Y, are coincident when the metal atom is divalent; and m represents an integer of 1 to 6. In the third aspect, the solubility of the phosphate ester compound in the electrolytic solution is further reduced, and the thermal stability is enhanced because of the chemical structure. Consequently, the thermal stability of the nonaqueous electrolyte secondary battery can be improved.

In a fourth aspect, for example, the metal oxide powder according to any one of first to third aspects may be aluminum oxide. In the fourth aspect, the chemical stability in the battery environment can be improved.

In a fifth aspect, for example, a layer containing the metal oxide powder according to any one of first to fourth aspects may be disposed between the positive electrode and the separator. In the fifth aspect, the layer can efficiently trap water adsorbed to the phosphate ester compound near the positive electrode.

An embodiment of the present disclosure will now be described in detail. The nonaqueous electrolyte secondary battery according to an embodiment of the present disclosure has, for example, a structure including an electrode assembly and a nonaqueous electrolyte accommodated in an outer package, where the electrode assembly includes a positive electrode and a negative electrode wound or laminated with a separator between the positive electrode and the negative electrode. More specifically, as described below, the electrode assembly includes a layer containing a metal oxide powder between the positive electrode and the negative electrode. The positive electrode contains a specific phosphate ester compound. Each component of the nonaqueous electrolyte secondary battery will now be described in detail.

Positive Electrode

FIG. 1 is a cross-sectional view of a positive electrode 10 of an embodiment of the present disclosure. The positive electrode 10 is composed of a positive electrode collector 20 of, for example, metal foil and a positive electrode active material layer 22 disposed on the positive electrode collector 20. The positive electrode collector 20 is, for example, metal foil that is stable in the potential range of the positive electrode or a film having a surface layer of a metal that is stable in the potential range of the positive electrode. The metal stable in the potential range of the positive electrode is preferably aluminum. The positive electrode active material layer 22 preferably contains a conducting agent 26, a binding agent 28, and a phosphate ester compound 30, in addition to the positive electrode active material 24. The positive electrode active material layer 22 is formed by mixing these materials with an appropriate solvent into a slurry, applying the slurry onto the positive electrode collector 20, and then drying and rolling the resulting coating film.

The positive electrode active material 24 can be a transition metal oxide containing an alkali metal element or a transition metal oxide in which a part of the transition metal element contained therein is substituted with a different element. Examples of the alkali metal element include lithium (Li) and sodium (Na), and Li is preferable. The transition metal element can be at least one element selected from the group consisting of scandium (Sc), manganese (Mn), iron (Fe), cobalt (Co), nickel (Ni), copper (Cu), and yttrium (Y). In particular, Mn, Co, and Ni are preferable. The different element can be at least one element selected from the group consisting of magnesium (Mg), aluminum (Al), zirconium (Zr), tantalum (Ta), tungsten (W), molybdenum (Mo), lead (Pb), antimony (Sb), and boron (B). In particular, Mg, Al, Zr, Ta, and W are preferable.

Examples of such a positive electrode active material 24 include lithium-containing transition metal oxides containing lithium as the alkali metal element, such as $LiCoO_2$, $LiNiO_2$, $LiMn_2O_4$, $LiMnO_2$, $LiNi_{1-y}Co_yO_2$ (0<y<1), $LiNi_{1-y-z}Co_yMn_zO_2$ (0<y+z<1), and $LiFePO_4$. These materials as the positive electrode active material 24 may be used alone or in a combination of two or more thereof.

The conducting agent 26 is used for enhancing the electronic conductivity of the positive electrode active material layer 22. The conducting agent 26 may be, for example, a carbon material, metal powder, metal oxide, or organic material having conductivity. Specifically, examples of the carbon material include acetylene black, Ketjen black, and graphite; examples of the metal powder include aluminum; examples of the metal oxide include potassium titanate and titanium oxide; and examples of the organic material include phenylene derivatives. These materials as the conducting agent 26 may be used alone or in a combination of two or more thereof.

The binding agent 28 is used for maintaining the good contact between the molecules of the positive electrode active material 24 and between the positive electrode active material 24 and the conducting agent 26 and for enhancing the binding property of, for example, the positive electrode active material 24 to the surface of the positive electrode collector 20. The binding agent 28 can be a fluoropolymer or a rubber polymer. Specifically, examples of the fluoropolymer include polytetrafluoroethylene (PTFE), polyvinylidene fluoride (PVdF), and modified products thereof; and examples of the rubber polymer include ethylene-propylene-isoprene copolymers and ethylene-propylene-butadiene copolymers. The binding agent 28 may be used together with a thickener, such as carboxymethyl cellulose (CMC) or polyethylene oxide (PEO).

The phosphate ester compound 30 is a powder having flame retardancy and delays the start of exothermic reaction between the electrolytic solution and the positive electrode active material 24 and functions as a reaction inhibitor (flame retardant) reducing the amount of heat generated by the reaction. Such a phosphate ester compound 30 includes at least one metal atom and represented by Formula (1):

[Chem. 4]

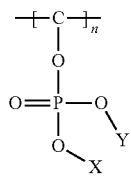

(1)

where X and Y each independently represent a metal atom, a hydrogen atom, or an organic group, provided that at least one of X and Y represents a metal atom and that when the metal atom is divalent, X and Y represent a single metal atom; and n represents an integer of 2 or more and 10 or less.

The phosphate ester compound represented by Formula (1) includes at least one metal atom as X or Y. The metal atom represented by X or Y (in Formula (1) may be any metal atom that does not adversely affect the battery characteristics, and examples thereof include metal atoms belonging to typical metal elements or transition metal elements. In particular, monovalent or divalent metal atoms are preferred. Examples of the monovalent or divalent metal atom include Ca, Mg, Na, K, and Zn. Ca and Mg are particularly preferred from the viewpoint of, for example, solubility in the electrolytic solution and thermal stability.

The organic group represented by X or Y of the phosphate ester compound represented by Formula (1) is a group containing at least one carbon atom and is preferably an organic group containing a carbon-hydrogen bond. In the case of an organic group containing two or more carbon atoms, the organic group may be a saturated organic group all the carbon-carbon bonds of which are single bonds or may be an unsaturated organic group containing at least one double or triple carbon-carbon bond. The organic group may contain a hetero atom, such as an oxygen, nitrogen, or sulfur atom. Examples of such an organic group include alkyl, alkoxy, cycloalkyl (preferably C3 to C10 cycloalkyl), aryl (preferably C6 to C10 aryl), and aralkyl (preferably C7 to C10 aralkyl) groups each having 1 to 10 carbon atoms. The organic group may be any organic group and is more preferably monovalent or divalent organic group. When X or V is a di- or more valent organic group, the organic group may form a cross-linking group with arbitrary X or Y.

A larger amount of phosphorus in the phosphate ester compound 30 is generally presumed to improve the flame retardancy. Accordingly, n in Formula (1) represents an integer of 2 or more and 10 or less, and may be an integer of 11 or more.

In the phosphate ester compound represented by Formula (1), n carbon atoms form a chain structure or a cyclic structure. The phosphate ester compound represented by Formula (1) having a cyclic structure has a lower degree of solvation than that of the phosphate ester compound having a chain structure and is therefore presumed to be insoluble in the electrolytic solution. Accordingly, the phosphate ester compound represented by Formula (1) preferably has a cyclic structure. The phosphate ester compound having a cyclic structure is preferably a metal salt of myo-inositol-1,2,3,4,5,6-hexaphosphate represented by Formula (2) and is more preferably a metal salt of myo-inositol-1,2,3,4,5,6-hexaphosphate represented by Formula (3) from the viewpoint of structural stability.

[Chem. 5]

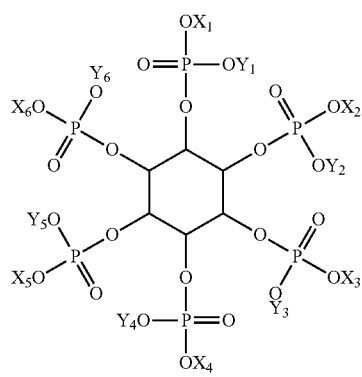

(2)

where $X_1$ to $X_6$ and $Y_1$ to $Y_6$ each independently represent a metal atom, a hydrogen atom, or an organic group, provided that at least one of $X_1$ to $X_6$ and $Y_1$ to $Y_6$ represents a metal atom and that when the metal atom is divalent, $X_m$ and $Y_m$, in which the subscript m of X is the same as that of Y and m represents an integer of 1 to 6, represent a single metal atom.

[Chem. 6]

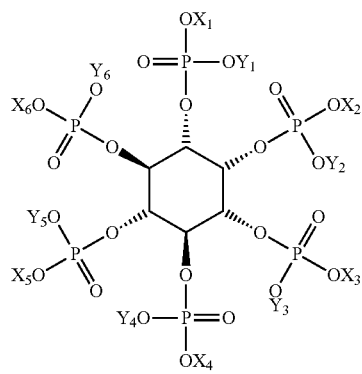

(3)

where $X_1$ to $X_6$ and $Y_1$ to $Y_6$ each independently represent a metal atom, a hydrogen atom, or an organic group, provided that at least one of $X_1$ to $X_6$ and $Y_1$ to $Y_6$ represents a metal atom and that when the metal atom is divalent, $X_m$ and $Y_m$, in which the subscript m of X is the same as that of Y and m represents an integer of 1 to 6, represent a single metal atom.

The phosphate ester compounds represented by Formulae (1) to (3) each have at least one metal atom as X or Y. From the viewpoint of, for example, the solubility in the electrolytic solution and thermal stability, X and Y in Formula (1) or $X_m$ and $Y_m$ in Formula (2) or (3) are preferably Ca or Mg, i.e., the phosphate ester compound is preferably a metal salt of inositol-hexaphosphate, in particular, a metal salt of myo-inositol-hexaphosphate, represented by a compositional formula: $C_6H_6Ca_kMg_{6-k}O_{24}P_6$, $0 \leq k \leq 6$. Here, a calcium-magnesium double salt of myo-inositol-hexaphosphate (average compositional formula: $C_6H_6Ca_5Mg_1O_{24}P_6$, molecular weight: 872.6) represented by chemical formula (4) can be exemplified,

[Chem. 7]

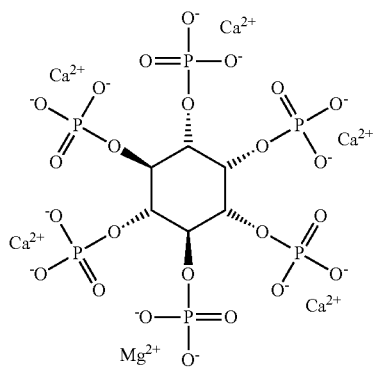

(4)

The phosphate ester compounds represented by any of Formulae (1) to (4) is available from, for example, Tokyo Chemical Industry Co., Ltd. (Product code: P0410) and Tsuno Co., Ltd.

Oxidation reaction of the electrolytic solution by the positive electrode active material 24 is presumed to occur during charging as a side reaction between the electrolytic solution and the positive electrode active material 24. This oxidation reaction is an exothermic reaction inducing heat generation and therefore increases the temperature inside the battery. In order to efficiently inhibit this reaction, it is effective to allow the phosphate ester compound 30 to be present near the positive electrode active material 24.

Accordingly, the phosphate ester compound 30 is preferably present in the positive electrode 10 and is, as described above, contained in the positive electrode active material layer 22 together with, for example, the positive electrode active material 24. The positive electrode active material layer 22 is formed by, for example, applying a mixture slurry containing, for example, a positive electrode active material 24, a conducting agent 26, and a binding agent 28 onto the positive electrode collector 20. A positive electrode active material layer 22 dispersing the phosphate ester compound 30 can be formed by adding the phosphate ester compound 30 to the slurry. Alternatively, considering, for example, the energy density of the positive electrode 10, the phosphate ester compound 30 may be present on the surface opposing to the positive electrode active material layer 22 of the positive electrode 10 of the separator by, for example, applying a dispersion containing the phosphate ester compound 30 to the opposing surface.

The phosphate ester compound 30 is preferably insoluble in the electrolytic solution so as to stay in the positive electrode active material layer 22. The solubility of the phosphate ester compound 30 in the electrolytic solution can be used as an indicator to be insoluble.

The solubility is measured as follows. A nonaqueous solvent is prepared by mixing ethylene carbonate (EC), ethyl methyl carbonate (EMC), and dimethyl carbonate (DMC) at a mass ratio of 3:3:4. Here, this solvent mixture is used to as the electrolytic solution. This electrolytic solution (10 g) is mixed with a phosphate ester compound 30 (1 g), and the mixture is sufficiently stirred at 25° C. The electrolytic solution is then filtered, and the mass of the undissolved residue is measured to determine the amount of the phosphate ester compound 30 dissolved in the electrolytic solution. The solubility (% by mass) of the phosphate ester compound 30 in the electrolytic solution is calculated by dividing the dissolved amount (mass: g) of the phosphate ester compound 30 at an environmental temperature of 25° C. by the mass (mass: g) of the electrolytic solution and multiplying the resulting value by 100.

The solubility of the phosphate ester compound 30 in the electrolytic solution is preferably 0.1% by mass or less. The lower limit of the solubility is not specifically limited, and a solubility of 0% by mass, i.e., a phosphate ester compound 30 is insoluble in the electrolytic solution (nonaqueous solvent), is more preferred.

The content of the phosphate ester compound 30 in the positive electrode active material layer 22 is preferably determined based on the volume energy density in the positive electrode. Specifically, the content of the phosphate ester compound 30 based on the total amount of the positive electrode active material 24 is preferably 0.1% by mass or more and 10% by mass or less, more preferably 0.5% by mass or more and 5% by mass or less, and most preferably 1% by mass or more and 3% by mass or less. A content of higher than 10% by mass may decrease the energy density of the positive electrode active material layer 22, whereas a content of less than 0.1% by mass may not provide a sufficient effect as a flame retardant. The phosphate ester compound represented by any of Formulae (1) to (3) has a low solubility in the electrolytic solution and therefore stays near the positive electrode active material 24 without eluting into the electrolytic solution to effectively inhibit the side reaction in the positive electrode 10. That is, even if the amount of the phosphate ester compound 30 added to the positive electrode active material layer 22 is small, the nonaqueous electrolyte secondary battery can be provided with sufficient flame retardancy, compared to the case of using a flame retardant soluble in the electrolytic solution.

In a nonaqueous electrolyte secondary battery, the content of the phosphate ester compound 30 contained in the positive electrode active material layer can be measured, for example, as follows. The nonaqueous electrolyte secondary battery is disassembled. The positive electrode is taken out from the battery outer package and is cleaned with a nonaqueous solvent to remove the electrolytic solution. The positive electrode active material layer is then collected by scraping. The resulting positive electrode active material layer is analyzed by emission spectrometry (ICP) and nuclear magnetic resonance spectrometry (NMR) to identify and quantitatively determine the phosphate ester compound 30 contained in the positive electrode active material layer of the nonaqueous electrolyte secondary battery.

[Negative Electrode]

The negative electrode includes a negative electrode collector of, for example, metal foil and a negative electrode active material layer disposed on the negative electrode collector. The negative electrode collector can be, for example, metal foil that is stable in the potential range of the negative electrode, such as aluminum or copper, or can be a film having a surface layer of such a metal. The negative electrode active material layer preferably contains a binding agent, in addition to the negative electrode active material that can occlude and release lithium ions, and further optionally contains a conductive material.

The negative electrode active material may be any material that can occlude and release alkali metal ions. Examples of such a negative electrode active material include carbon materials, metals, alloys, metal oxides, metal nitrides, and alkali metal-occluded carbon or silicon compounds. Examples of the carbon materials include natural graphite, artificial graphite, and pitch-based carbon fibers. Examples of the metals and the alloys include lithium (Li), silicon (Si), tin (Sn), germanium (Ge), indium (In), gallium (Ga), lithium alloys, silicon alloys, and tin alloys. These materials as the negative electrode active material may be used alone or in a mixture of two or more thereof.

The binding agent contained in the negative electrode active material layer can be, for example, a fluoropolymer or a rubber polymer, as in the positive electrode 10, and is preferably a rubber polymer such as a styrene-butadiene copolymer (SBR) or its modified product. The binding agent may be used together with a thickener, such as carboxymethyl cellulose (CMC).

The negative electrode collector is, for example, metal foil that does not form an alloy with lithium within the potential range of the negative electrode or a film having a surface layer of a metal that does not form an alloy with lithium within the potential range of the negative electrode. The metal that does not form an alloy with lithium within the potential range of the negative electrode is preferably copper, because of its low cost, easiness in processing, and high electron conductivity.

[Separator]

The separator is a porous film having ion permeability and insulation properties and is disposed between the positive electrode and the negative electrode. Examples of the porous film include microporous thin films, woven cloth, and non-woven cloth. The material used as the separator is preferably polyolefin. More specifically, the separator is made of polyolefin alone or is mainly made of polyolefin (e.g., 95% by mass or more). Preferred examples of the polyolefin include polyethylene (PE) and polypropylene (PP).

[Layer Containing Metal Oxide Powder]

In the nonaqueous electrolyte secondary battery according to an embodiment of the present disclosure, the electrode assembly includes a layer containing a metal oxide powder (hereinafter, in the specification, also referred to as "metal oxide-containing layer"), being independent of the separator, between the positive electrode and the negative electrode. The metal oxide-containing layer has on permeability and is preferably a porous layer. The metal oxide-containing layer preferably contains a binding agent and may further contain an inorganic filler not being metal oxides, such as a metal nitride or a metal carbide, within a range that does not impair the effects of the present disclosure. In the nonaqueous electrolyte secondary battery of the present disclosure, the metal oxide-containing layer disposed between the positive electrode and the negative electrode traps water adsorbed to the phosphate ester compound contained in the positive electrode before the water reaches the negative electrode and can inhibit the side reaction at the negative electrode.

The metal oxide-containing layer may contain any metal oxide powder, and examples of the metal oxide powder include powders of aluminum oxide (alumina), silicon oxide (silica), titanium oxide (titania), zirconium oxide (zirconia), magnesium oxide, yttrium oxide, and aluminum titanate. These powders may be used alone or in a combination of two or more thereof. The metal oxide powder contained in the metal oxide-containing layer is preferably aluminum oxide, silicon oxide or titanium oxide, more preferably aluminum oxide, from the viewpoint of chemical stability in the battery environment. In this disclosure, the term "metal oxide" includes a hydrate thereof. For example, the term "aluminum oxide" refers to aluminum oxide itself and hydrates of aluminum oxide, such as alumina monohydrate (boehmite) having a composition of $Al_2O_3 \cdot H_2O$.

The metal oxide powder and the inorganic filler contained in the metal oxide-containing layer preferably have a volume average particle diameter of primary particles of 1.0 µm or less and more preferably 0.5 µm or less, from the viewpoint of smoothness of the coating surface and an increase in area of the surface being in contact with the electrolytic solution. The lower limit of the volume average particle diameter is not specifically limited, and is preferably 0.05 um or more.

The binding agent contained in the metal oxide-containing layer can be, for example, a fluoropolymer or a rubber polymer, as in the positive electrode 10 and the negative electrode. Examples of the fluoropolymer include PTFE and PVdF and modified products thereof. Examples of the rubber polymer include ethylene-propylene-isopropylene copolymers, ethylene-propylene-butadiene copolymers, and SBR. These agents may be used alone or in a combination of two or more thereof. The binding agent may be used together with a thickener such as CMC or PEO. The content of the binding agent is preferably 0.1% by mass or more and 10% by mass or less, more preferably 5% by mass or less, based on the total amount of the metal oxide-containing layer. If the content of the binding agent is higher than 10% by mass, the binding agent covers the surface of the metal oxide powder to reduce the contact surface with the electrolytic solution, which may reduce the function of trapping water adsorbing to the phosphate ester compound, whereas a content of less than 0.1% by mass may not exhibit the effect of the binding agent.

In the electrode assembly, the metal oxide-containing layer may be provided on at least one surface of the positive electrode, the negative electrode, and the separator and may be disposed between the positive electrode and the negative electrode as a sheet being independent of all of the positive electrode, the negative electrode, and the separator. The metal oxide-containing layer may be a monolayer or a multilayer. The metal oxide-containing layer is preferably disposed between the positive electrode and the separator. As a result, the layer can efficiently trap water near the positive electrode before the water reaches the negative electrode.

The metal oxide-containing layer can be formed by, for example, casting raw materials composed of a metal oxide powder, a binding agent, and optionally an inorganic or organic filler onto at least one of the surfaces of the positive electrode, the negative electrode, and the separator. More specifically, raw materials, such as the metal oxide powder and the binding agent, are mixed with a liquid component to prepare a paste or slurry; the paste or slurry is applied onto at least one surface of the positive electrode, the negative electrode, and the separator; and the liquid component is then removed by drying. The raw materials and the liquid component are mixed with, for example, a dual arm kneader. The paste or slurry can be applied with, for example, a doctor blade or a die coater.

The metal oxide-containing layer as an independent sheet can be produced by, for example, as follows. As in above, raw materials, such as a metal oxide powder and a binding agent, are mixed with a liquid component to prepare a paste or slurry; the paste or slurry is coated on a flat base material; and the liquid component is then removed by drying. The sheet of the metal oxide-containing layer containing the metal oxide powder and the binding agent is peeled from the base material to provide a sheet-like metal oxide-containing layer. The thus-produced sheet-like metal oxide-containing layer is disposed between the positive electrode and the negative electrode, for example, between the positive electrode and the separator or between the negative electrode and the separator to produce a nonaqueous electrolyte secondary battery. Examples of the base material include glass plates and stainless steel (SUS) plates.

The metal oxide-containing layer preferably has a thickness of 1 to 10 μm and more preferably 3 to 5 μm. A too thin metal oxide-containing layer may not provide a sufficient effect of trapping water, whereas a too thick metal oxide-containing layer may be fragile or may reduce the energy density of the electrode assembly.

[Nonaqueous Electrolyte]

The nonaqueous electrolyte includes a nonaqueous solvent and an electrolyte salt soluble in the nonaqueous solvent. Examples of the nonaqueous solvent include cyclic carbonates, chain carbonates, carboxylic acid esters, cyclic ethers, chain ethers, nitriles such as acetonitrile, and amides such as dimethylformamide; and their halogen substitution products having halogen atoms, such as fluorine atoms, substituted for hydrogen atoms. These nonaqueous solvents may be used alone or in a combination of two or more thereof. The nonaqueous electrolyte is not limited to liquid electrolytes (nonaqueous electrolytic solutions) and may be a solid electrolyte, such as gelled polymers.

Examples of the cyclic carbonates include ethylene carbonate (EC), propylene carbonate, and butylene carbonate. Among them, EC is particularly preferred. Examples of the chain carbonates include dimethyl carbonate (DMC), ethyl methyl carbonate (EMC), diethyl carbonate, methyl propyl carbonate, ethyl propyl carbonate, and methyl isopropyl carbonate. Among them, DMC and EMC are particularly preferred.

Examples of the carboxylic acid esters include methyl acetate, ethyl acetate, propyl acetate, methyl propionate, ethyl propionate, and γ-butyrolactone. Examples of the cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether. Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, methylene glycol dimethyl ether, and tetraethylene glycol dimethyl ether.

Preferred examples of the nonaqueous solvent include combinations containing ethylene carbonate (EC), ethyl methyl carbonate (EMC), and dimethyl carbonate (DMC). In this case, the contents of EC, EMC, and DMC are respectively 10% to 40% by mass, 15% to 45% by mass, and 20% to 50% by mass, based on the total amount of the nonaqueous solvent.

The electrolyte salt can be an alkali metal salt, and preferred are lithium salts. The lithium salts may be those usually used as supporting electrolytes in known nonaqueous electrolyte secondary batteries. Examples of the lithium salts include $LiPF_6$, $LIBE_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m each independently represent an integer of 1 or more), $LiC(C_pF_{2p+1}SO_2)(C_qF_{2q+1}SO_2)(C_rF_{2r+1}SO_2)$ (p, q, and r each independently represent an integer of 1 or more), $Li[B(C_2O_4)_2]$ (lithium bis(oxalato)borate (LiBOB)), $Li[B(C_2O_4)F_2]$, $Li[P(C_2O_4)F_4]$, and $Li[P(C_2O_4)_2F_2]$. These lithium salts may be used alone or in a combination of two or more thereof.

The nonaqueous electrolyte can contain an additive that is used for, for example, forming a good coating film on the positive electrode or on the negative electrode. Examples of the additive include vinylene carbonate (VC), ethylene sulfite (ES), and cyclohexylbenzene (CHB), and modified products thereof. The additives may be used alone or in a combination of two or more thereof. The proportion of the additive added to the electrolytic solution is not specifically limited, and is preferably about 0.05% to 10% by mass based on the total amount of the electrolytic solution.

EXAMPLES

The present disclosure will now be more specifically described with reference to examples and comparative examples, but is not limited to the following examples. In order to evaluate the effects of the flame retardant, nonaqueous electrolyte secondary batteries to be used in Examples 1 and 2 and Comparative Examples 1 to 3 were produced. A specific process producing a nonaqueous electrolyte secondary battery is as follows.

Example 1

Production of Positive Electrode

The positive electrode active material used was a lithium-containing transition metal oxide represented by a compositional formula:
$LiNi_{0.35}Co_{0.35}Mn_{0.3}O_2$. The positive electrode was produced as follows. A mixture was prepared by mixing the respective components to give a composition of 92% by mass of a positive electrode active material represented by the compositional formula: $LiNi_{0.35}Co_{0.35}Mn_{0.3}O_2$, 5% by mass of an acetylene black serving as a conducting agent, and 3% by mass of a polyvinylidene fluoride powder serving as a binding agent. This mixture was mixed with 3% by mass of a calcium-magnesium double salt of myo-inositol-hexaphosphate represented by Formula (4) based on the mass of the mixture, and the resulting mixture was further mixed with an N-methyl-2-pyrrolidone (NMP) solution to prepare a slurry. This slurry was applied onto both surfaces of an aluminum positive electrode collector having a thickness of 15 μm by a doctor blade method to form positive electrode active material layers. Compression using a compression roper was then performed to produce a positive electrode.

Production of Negative Electrode

The negative electrode active material used was a blend of three types of graphite: natural graphite, artificial graphite, and artificial graphite coated with amorphous carbon. The negative electrode was produced as follows. A mixture was prepared by mixing the respective components to give a composition composed of 98% by mass of a negative electrode active material, 1% by mass of a styrene-butadiene copolymer (SBR) serving as a binding agent, and 1% by mass of a carboxymethyl cellulose (CMC) serving as a thickener. The mixture was mixed with water to prepare a slurry. This slurry was applied onto both surfaces of a copper negative electrode collector having a thickness of 10 μm by a doctor blade method to form a negative electrode active material layer.

A mixture of 97% by mass of alumina powder (volume average particle diameter: 0.3 μm) and 3% by mass of a styrene-butadiene copolymer (SBR) serving as a binding agent was mixed with water as a dispersion medium to prepare a metal oxide-containing slurry. This metal oxide-containing slurry was applied onto both surfaces of the negative electrode produced above to cover the negative electrode active material layer. The negative electrode provided with the metal oxide-containing slurry coating films was dried at 85° C. under vacuum reduced pressure for 1 hour to form a metal oxide-containing layer having a thickness of 4 μm. A predetermined density was then provided by compression using a compression roller to produce a negative electrode.

Production of Electrolytic Solution $LiPF_6$ serving as an electrolyte salt was dissolved in an amount of 1.0 mol/L in a nonaqueous solvent mixture of ethylene carbonate (EC), ethyl methyl carbonate (EMC), and dimethyl carbonate (DMC) mixed at a mass ratio of 3:3:4 to prepare an electrolytic solution. This electrolytic solution was used for producing batteries. The solubility of the calcium-magnesium double salt of myo-inositol-hexaphosphate represented by Formula (4) in the electrolytic solution was less than 0.1% by mass at 25° C.

Production of Cylindrical Nonaqueous Electrolyte Secondary Battery

A cylindrical nonaqueous electrolyte secondary battery (hereinafter, referred to as cylindrical battery) was produced from the resulting positive electrode, negative electrode, and electrolytic solution and a PE porous film having a thickness of 20 μm serving as a separator by the following procedure. The positive electrode produced above was cut into a strip having a short side length of 55 mm and a long side length of 600 mm. The negative electrode was cut into a strip having a short side length of 57 mm and a long side length of 620 mm. The positive electrode and the negative electrode were wound with the separator therebetween to produce a wound electrode assembly. Subsequently, an insulating plate was disposed on each of the top and the bottom of the wound electrode assembly. The wound electrode assembly was placed in a cylindrical battery outer can of steel having a diameter of 18 mm and a height of 65 mm such that the wound electrode assembly functions as a negative electrode terminal. The current collection tab of the negative electrode was welded to the bottom inside the battery outer can, and the current collection tab of the positive electrode was welded to the bottom plate part of a current interruption sealing body having a built-in safety device. The electrolytic solution was put in the battery outer can through the opening of the can. The battery outer can was sealed with the current interruption sealing body including a safety valve and a current interrupting device to give a cylindrical battery.

Production of Coin Nonaqueous Electrolyte Secondary Battery

A coin nonaqueous electrolyte secondary battery (hereinafter, referred to as coin battery) was produced using the positive electrode, negative electrode, and electrolytic solution prepared as in above by the following procedure. In the positive electrode, a slurry was applied to one surface of the positive electrode collector during the production of the positive electrode. The positive electrode produced above was punched out into a size having a diameter of 17 mm, and the negative electrode was punched out into a size having a diameter of 19 mm. Subsequently, the negative electrode was press-bonded to the inner side of the bottom of a coin battery outer package made of steel composed a lid portion having a diameter of 20 mm and a height of 5 mm and a bottom portion. On the negative electrode, a separator, a positive electrode, a circular steel cover plate, and a disc spring were placed in this order in the outer package. The electrolytic solution was supplied in the bottom portion of the battery outer package, followed by covering with the lid portion. The battery outer package was caulked to hermetically seal the outer package to give a coin battery.

Example 2

A positive electrode active material layer was formed on each surface of an aluminum positive electrode collector having a thickness of 15 μm as in Example 1. Subsequently, a mixture composed of 97% by mass of an alumina powder (volume average particle diameter: 0.3 μm and 3% by mass of a styrene-butadiene copolymer (SBR) serving as a binding agent was mixed with water as a dispersion medium to prepare a metal oxide-containing slurry. This metal oxide-containing slurry was applied onto both surfaces of the positive electrodes produced above to cover the positive electrode active material layers. The positive electrode provided with the metal oxide-containing slurry coating films was dried at 85° C. under vacuum reduced pressure for 1 hour to form a metal oxide-containing layer having a thickness of 4 μm. Compression using a compression roller was then performed to produce a positive electrode of Example 2. In addition, as in Example 1, a negative electrode active material layer was formed on each surface of a copper negative electrode collector having a thickness of 10 μm. A predetermined density was then provided by compression using a compression roller to produce a negative electrode of Example 2 not provided with metal oxide-containing layers. A cylindrical battery and a coin battery to be used in Example 2 were produced as in Example 1 except that the positive electrode of Example 2 and the negative electrode of Example 2 were used.

Comparative Example 1

A positive electrode to be used in Comparative Example 1 was produced as in Example 1 except that the calcium-magnesium double salt of myo-inositol-hexaphosphate serving as the flame retardant was not used. In addition, a negative electrode active material layer was formed on each surface of a copper negative electrode collector having a thickness of 10 μm as in Example 1, and a predetermined density was then provided by compression using a compression roller to produce a negative electrode of Comparative Example 1 not provided with metal oxide-containing layers. A cylindrical battery and a coin battery to be used in Comparative Example 1 were produced as in Example 1 except that the positive electrode of Comparative Example 1 and the negative electrode of Comparative Example 1 were used.

Comparative Example 2

A cylindrical battery and a coin battery to be used in Comparative Example 1 was produced as in Example 2 except that calcium-magnesium double salt of myo-inositol-hexaphosphate serving as the flame retardant was not used.

Comparative Example 3

A negative electrode active material layer was formed on each surface of a copper negative electrode collector having a thickness of 10 μm as in Example 1, and a predetermined density was then provided by compression using a compression roller to produce a negative electrode of Comparative Example 3 not provided with metal oxide-containing layers. A cylindrical battery and a coin battery to be used in Comparative Example 3 were produced as in Example 1 except that this negative electrode of Comparative Example 3 was used.

Measurement of Differential Scanning Calorimetry

In order to comprehend the flame retardant effect by a phosphate ester compound, thermal analysis with a differential scanning calorimeter (DSC) was performed in the presence of a positive electrode active material and an electrolytic solution in full charge conditions. The coin batteries of Examples and Comparative Examples were charged at a constant current of 0.3 mA to a battery voltage of 4.35 V at 25° C. The coin battery was then disassembled. The positive electrode was taken out from the battery outer package and was cleaned with a nonaqueous solvent to remove the electrolytic solution. The positive electrode active material layer was then collected by scraping. The resulting positive electrode active material layer (1 mg) was sealed in pressure-resistant airtight container together with the electrolytic solution (1 to prepare a measurement sample. This measurement sample was heated from 25° C. to 550° C. at a rate of temperature increase of 10° C./min, and the exothermic onset temperature and the initial exothermic peak temperature of the sample were measured with a DSC.

Evaluation of Initial Charge/Discharge Efficiency

The cylindrical batteries of Examples and Comparative Examples were evaluated for initial charge/discharge efficiency. The cylindrical batteries of Examples and Comparative Examples were charged at a constant current of 250 mA to a battery voltage of 4.35 V at 25° C. and were then charged at a constant voltage of 4.35 V, Subsequently, after the charging current value reached 50 mA, discharge was performed at a constant current of 250 mA until the battery voltage reached 2.5 V. The discharging capacity on this occasion was divided by the charging capacity, and then the resulting value was multiplied by 100 to obtain the initial charge/discharge efficiency (%).

Table 1 shows the exothermic onset temperatures, the exothermic peak temperatures, and initial charge/discharge efficiencies of the nonaqueous electrolyte secondary batteries of Examples and Comparative Examples.

TABLE

| | Flame retardant | | Ceramic layer | | Exothermic onset temperature (° C.) | Exothermic peak temperature (° C.) | Initial charge/discharge efficiency (%) |
|---|---|---|---|---|---|---|---|
| | Compound | Amount (% by mass) | Metal oxide | Disposition | | | |
| Example 1 | IP$_6$CaMg | 3.0 | Alumina | Negative electrode surface | 270 | 307 | 81.5 |
| Example 2 | IP$_6$CaMg | 3.0 | Alumina | Positive electrode surface | 270 | 307 | 81.5 |
| Comparative Example 1 | Not added | | | None | 254 | 290 | 81.7 |
| Comparative Example 2 | Not added | | Alumina | Negative electrode surface | 254 | 290 | 81.6 |
| Comparative Example 3 | IP$_6$CaMg | 3.0 | | None | 270 | 307 | 80.3 |

IP$_6$CaMg: Ca Mg double salts of myo-inositol-1,2,3,4,5,6-hexaphosphate

Table demonstrates that the exothermic onset temperatures and the exothermic peak temperatures in Examples 1 and 2 were all higher than those in Comparative Examples 1 and 2 to give the results showing excellent flame retardancy. Accordingly, it was confirmed that addition of a small amount of a phosphate ester compound represented by Formula (4) being a flame retardant insoluble in the electrolytic solution to the positive electrode can impart flame retardancy to the nonaqueous electrolyte secondary battery.

In comparison of the results of Comparative Examples 1 and 3 shown in Table, a reduction in the initial charge/discharge efficiency was observed in Comparative Example 3. It is presumed that since the phosphate ester compound represented by Formula (4) had high hydrophilicity and high hygroscopicity, water adsorbed to the phosphate ester compound during the process of producing the secondary battery diffused in the nonaqueous electrolytic solution after the production of the secondary battery to cause side reaction between the water and the negative electrode active material in the negative electrode, and thereby the initial charge/discharge efficiency was decreased. In contrast, the reduction in initial charge/discharge efficiency was inhibited in Examples 1 and 2 compared to Comparative Example 3, and the initial charge/discharge efficiencies in Examples 1 and 2 were substantially the same as that in the case of not containing the phosphate ester compound. This is presumed to be caused by that the disposition of a metal oxide-containing layer containing a metal oxide powder between the positive electrode and the negative electrode prevents the water adsorbed to the phosphate ester compound contained in the positive electrode from reaching the negative electrode and inhibits the side reaction between the water and the negative electrode active material in the negative electrode. Thus, the nonaqueous electrolyte secondary battery according to the present disclosure has excellent flame retardancy and excellent initial charge/discharge efficiency.

What is claimed is:

1. A nonaqueous electrolyte secondary battery comprising:
an electrode assembly including a positive electrode, a negative electrode, and a separator disposed between the electrodes; and
a nonaqueous electrolyte, wherein
the electrode assembly further includes a layer containing a metal oxide powder between the positive electrode and the negative electrode; and
the positive electrode contains a phosphate ester compound represented by Formula (1):

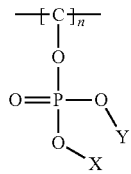

(1)

where X and Y each independently represent a metal atom, a hydrogen atom, or an organic group; at least one of X and Y represents a metal atom; X and Y are coincident when the metal atom is divalent; and n represents an integer of 2 or more and 10 or less.

2. The nonaqueous electrolyte secondary battery according to claim 1, wherein at least one of X and Y in Formula (1) is Mg or Ca.

3. The nonaqueous electrolyte secondary battery according to claim 1, wherein the phosphate ester compound is a metal salt of myo-inositol-1,2,3,4,5,6-hexaphosphate represented by Formula (3):

[Chem. 2]

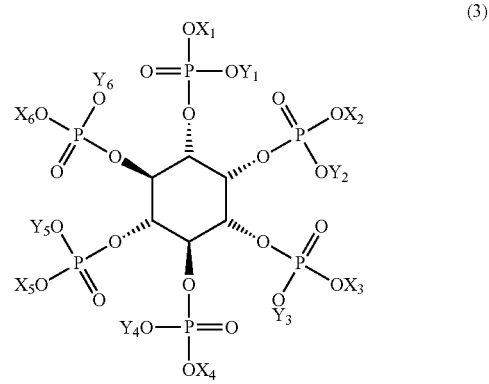

(3)

where $X_1$ to $X_6$ and $Y_1$ to $Y_6$ each independently represent a metal atom, a hydrogen atom, or an organic group; at least one of $X_1$ to $X_6$ and $Y_1$ to $Y_6$ represents a metal atom; $X_m$ and $Y_m$, in which the subscript m of X is the same as that of Y, are coincident when the metal atom is divalent; and m represents an integer of 1 to 6.

4. The nonaqueous electrolyte secondary battery according to claim 1, wherein the metal oxide powder is aluminum oxide.

5. The nonaqueous electrolyte secondary battery according to claim 1, wherein the layer containing a metal oxide powder is disposed between the positive electrode and the separator.

* * * * *